United States Patent [19]

Stang et al.

[11] 4,242,948

[45] Jan. 6, 1981

[54] INSULATED COMPOSITE PISTON

[75] Inventors: John H. Stang, Columbus; Kenneth A. Johnson, Elizabethtown, both of Ind.

[73] Assignee: Cummins Engine Company, Inc., Columbus, Ind.

[21] Appl. No.: 861,467

[22] Filed: Dec. 16, 1977

Related U.S. Application Data

[63] Continuation-in-part of Ser. No. 755,760, Dec. 30, 1976, abandoned.

[51] Int. Cl.² .......................... F01B 31/08; F16J 1/00
[52] U.S. Cl. .......................... 92/212; 92/176; 92/221; 92/224; 123/193 P
[58] Field of Search .......... 92/224, 212, 221, 222, 92/223, 176; 123/193 P, 41.16, 191 A

[56] References Cited

U.S. PATENT DOCUMENTS

| | | | |
|---|---|---|---|
| 1,518,048 | 12/1924 | Caughey | 123/191 A |
| 1,857,077 | 5/1932 | Adamson | 123/191 A |
| 1,904,070 | 4/1933 | Morgan | 123/193 P |
| 2,058,741 | 10/1936 | Taylor | 92/176 |
| 2,104,347 | 1/1938 | Larkin | 92/176 |
| 2,194,097 | 3/1940 | Reggio | 92/224 X |
| 2,478,294 | 8/1949 | Madsen | 92/176 X |
| 3,136,306 | 6/1964 | Kamm | 92/176 X |
| 3,187,643 | 6/1965 | Pope | 92/176 |
| 3,882,841 | 5/1975 | Silverstein | 92/176 X |

*Primary Examiner*—Irwin C. Cohen
*Attorney, Agent, or Firm*—Gary M. Gron; Robert T. Ruff

[57] ABSTRACT

The disclosure illustrates an insulated composite piston comprising a crown of ceramic or other heat resistant material secured to an aluminum piston body by a bolt of temperature resistant alloy. A low conductivity interface between the crown and the body is provided by a series of stacked discs having low effective thermal conductivity. The relative thermal expansion of the parts is compensated for by bellville washers on the bolt. The above arrangement insulates the crown from the piston body thereby minimizing the temperature gradient across the crown so that its temperature can be maintained as high as necessary to increase efficiency and minimize noxious emissions.

1 Claim, 2 Drawing Figures

INSULATED COMPOSITE PISTON

The government has rights in this invention pursuant to Contract No. DAAE07-75-C-0076 awarded by the U.S. Defense Department.

This application is a continuation in part of copending application Ser. No. 755,760 filed Dec. 30, 1976 and now abandoned.

In the internal combustion engine art and particularly that portion dealing with diesel engines, the insulated combustion chamber has been proposed to increase efficiency and minimize pollutants. Efficiency is increased because the amount of combustion heat rejected to the engine cooling system is minimized. Furthermore, the existing temperature available to drive the turbine of a turbocharged engine is greatly increased.

Past attempts at insulating the combustion chamber may be separated into a number of broad categories. The first is where surfaces of the combustion chamber are sprayed with a ceramic insulating material. These surfaces would include the piston crown, the cylinder head and possibly the walls of the cylinder. The difficulty with this approach is maintaining the integrity of the layer because of the stresses of the combustion cycle and the problems of thermal expansion.

Another approach has been to make one or more of the components which define the combustion chamber out of insulating material. Alternatively one may utilize a ceramic insert of substantial thickness in one of these components.

Problems arise with devices of this type because they are exposed on one side to the hot combustion gases and on the other side by the cooler supporting structure around the combustion chamber. As such, rather substantial temperature gradients (as high as 1200° F.) may exist across these materials. Excessive thermal stresses and distortion will result if the part is made from material other than ultra low thermal expansion material.

The above problems are solved by a piston having an annular crown of temperature resistant material positioned over a corresponding piston body. The crown and piston body are secured together and the interface between them is provided with means having a relatively low overall conductivity so that the temperature gradient across the crown is minimized.

The above and other features of the invention will be apparent from a reading of the following description of the disclosure shown in the accompanying drawings and the novelty thereof pointed out in the appended claims.

Figure 1:
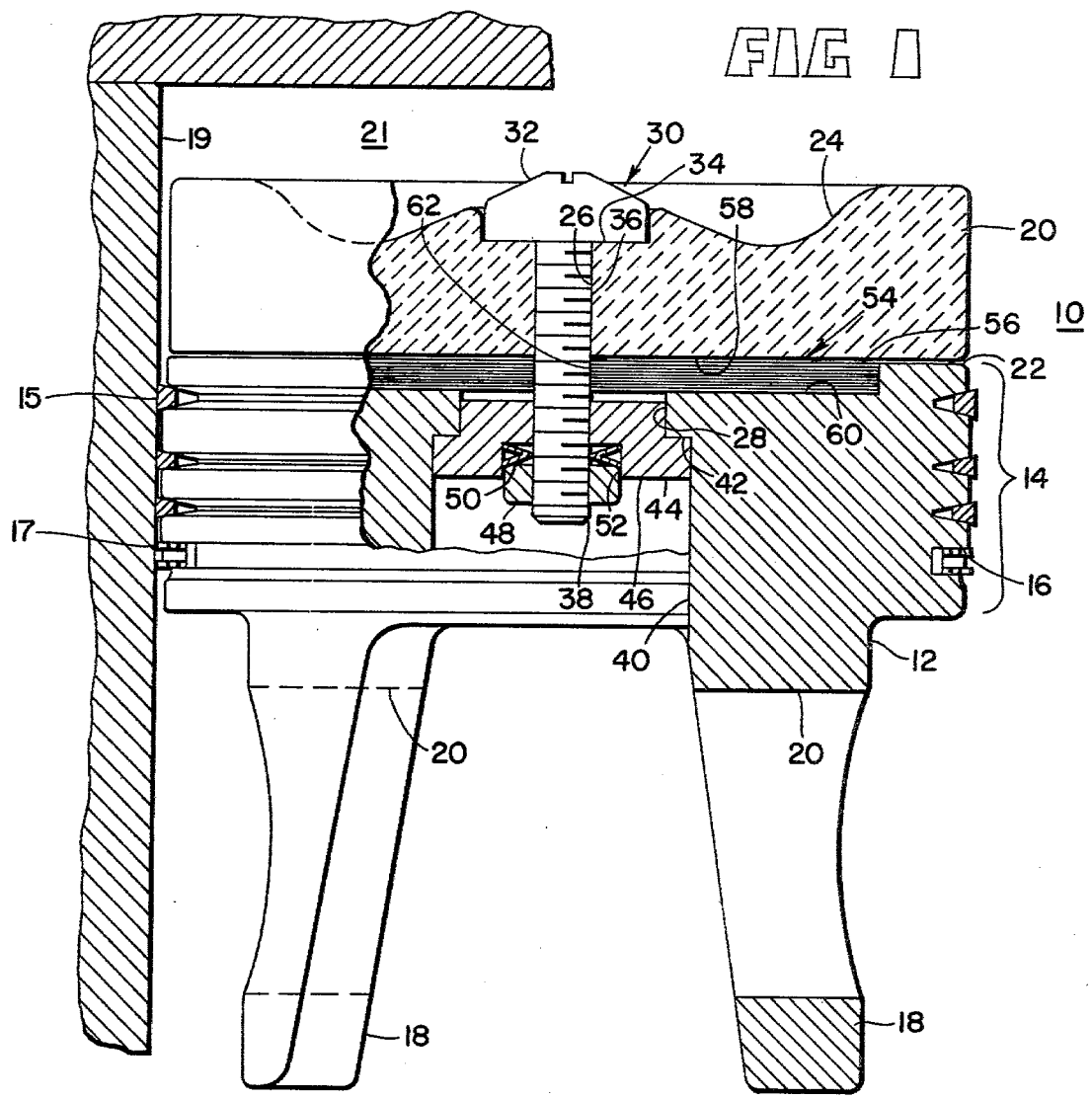
FIG. 1 is a longitudinal view, partially sectioned, illustrating a piston which embodies the present invention.

Referring to FIG. 1 there is shown a piston 10 comprising a generally annular body portion 12 having a ring band section 14 formed around its circular periphery. The ring band section 14 includes a plurality of circumferential grooves 16 which receive compression and oil rings 15, 17 respectively. The piston rings 15,17 seat against a bore 19 which terminates to form a combustion chamber 21.

The piston 10 is reciprocable in the bore 19. The piston body has wrist pin bosses 18 with aligned bores 23 adapted to receive a wrist pin which permits the piston body to be connected to a connecting rod (both elements are not shown). In an internal combustion engine the connecting rod is journaled on a crankshaft to provide a rotary output.

The piston 10 is shown as a cross head type piston which incorporates a separate skirt assembly connected to the piston body through the wrist pin. Although a skirt is necessary to successfully utilize the piston in an internal combustion engine, a specific description will be omitted in order to simplify the description of the present invention. It should be apparent to those skilled in the art that skirt sections may also be formed integrally with the piston body 12.

The piston also includes an crown portion 20 positioned over the upper surface 22 of piston body 12. Crown 20 has a circular periphery and an upper face 24 exposed to the combustion chamber 21 which has a "Mexican hat" configuration for efficient combustion. The configuration of upper face 24, however, need not be limited to this specific type. The crown 20 may be formed from any one of a number of heat resistant materials. Examples of such materials are ceramics such as silicon nitride ($Si_3N_4$), lithia alumina silica (LAS), fused silica ($SiO_2$) and silicon carbide (SiC), reaction sintered silicon carbide (RSS:C) sintered silicon carbide (SSic), and reaction bonded silicon nitride (RBSN). Any one of these materials can withstand temperature levels experienced in the combustion chamber. However, the construction shown below permits all of the above to be used successfully in spite of some other properties such as high thermal coefficient and thermal expansion.

Alternatively crown 20 may be formed from a heat resistant metal. Examples of such a material are stainless steel or coated more common steels. These materials do not have as high a temperature capability as the ceramics in that their temperature capability is approximately 1400°–1600° F. (760°–870° C.) compared to about 2200° F. (1200° C.) for ceramics. However, their temperature resistance is still high enough to permit an increase in combustion efficiency. In addition they are more readily adaptable to mass production.

The crown 20 and the piston body 12 each have coaxial holes 26 and 28 respectively. A bolt 30 having a head 32 received in recess 34 in crown 20 has a shank 36 extending through holes 26 and 28. Preferably, the head 32 of bolt 30 is shaped to form an extension of the upper face 24 of crown 20. In addition, bolt 32 is formed from a high temperature, high strength alloy, generally of a nickel or cobalt base. Examples of such alloys are Udimet 700, nimonic 115 or 90, R-41, or Waspalloy.

The shank 36 of bolt 30 terminates in a threaded portion 38 received in a recess 40 formed in the interior of piston body 12. Recess 40 has a shoulder 42. The flange 44 of a sleeve-like spacer 46 abuts shoulder 42. A nut 48 is threaded over the end of bolt 30. A spring assembly 50 acts against nut 48 and the inner wall of a recess 52 in spacer 46 to hold the crown 20 and piston body 12 together while permitting differential thermal expansion. As illustrated, the spring assembly 50 comprises a plurality of stacked belleville washers which are well known compact spring assemblies.

A prime feature of the present invention is the provision of an interface between crown 20 and piston body 12, generally designated as 54 which has a low effective thermal conductivity. As shown in FIG. 1, the interface 54 may comprise a plurality of substantially planar discs 56 sandwiched between the lower planar surface 58 of crown 20 and the planar floor of an annular recess 60 in the top of piston body 12. Each of the discs 56 has a central opening 62 receiving the shank 36 of bolt 30. The discs 56 are selected so that the effective thermal conductivity across the interface between adjacent discs is relatively low. A low effective thermal conductivity may be achieved with commonly available material by using steel washers having roughened surfaces, for example, a surface roughness of 200 in. It has been found that ordinary steel washers with no special roughening of their surface provide an overall low effective thermal conductivity.

The stacked discs are extremely effective in producing a low thermal conductivity. Heat transfer coefficients on the order of 0.5 BTU/HR-FT-°F. are achievable compared to 80 BTU/HR-FT-°F. for a solid piston body-crown interface. It should be noted also that a greater or lesser number of discs may be employed to achieve a greater or lesser thermal conductivity. Since the diameter of the discs 56 does not extend to the periphery of the crown 20 or piston body 12, their thickness is selected so that the portion of the crown 20 outside of these discs 56 is out of contact with the surface 22 of piston body 12.

Furthermore, the discs 56 support crown 20 over a relatively broad annular planar area defined at its inner diameter by the diameter of hole 28 and at its outer diameter by the diameter of discs 56. This area of contact minimizes the unit pressure on the discs 56 for a given pressure in combustion chamber 21 and therefore contributes to a low thermal conductivity across the interface between adjacent discs. The annular contact area divides the radius of crown 20 into approximately equal sections. It can be seen that the radial dimension of crown 20 between hole 26 and a point in line with the wall of hole 28 is approximately equal to the radial dimension between the periphery of discs 56 and the outer periphery of crown 20. The bending loads on the top of crown 20 due to combustion pressures are therefore equalized.

Figure 2:
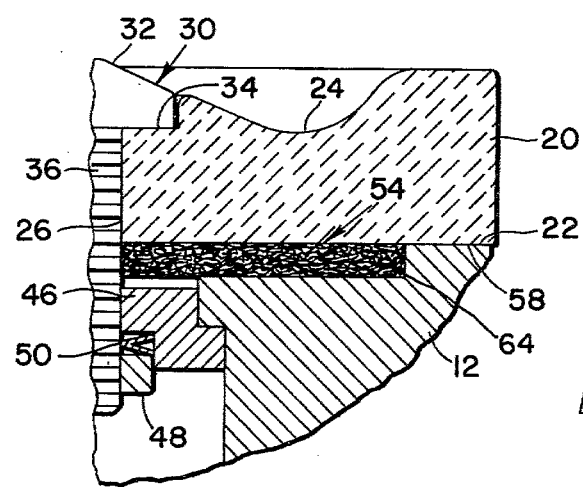
FIG. 2 is a fragmentary longitudinal view of a piston incorporating an alternate embodiment of the present invention.

The discs 56 shown in FIG. 1 constitute one way of insulating crown piston body 12. FIG. 2 shows an alternate form of interface 54' which uses a disc 64 which has a relatively low conductivity. This disc 64 may be formed of porous metal or of steel wool compressed sufficiently to resist compressive loads. In certain instances it may be also advantageous to use a plurality of discs 64.

With any of the interface materials described above, the crown 20 is effectively insulated from the piston body 12, usually formed of high conductivity aluminum. This insulation provides a primary advantage of minimizing the thermal gradient between the upper and lower surfaces 24 and 58 of crown 20, as such internal thermal stresses are substantially minimized. This permits the material selection for crown 20 to be very flexible since the material only must be able to withstand combustion temperatures and resist moderate compressive loads. The temperature gradient for the most part is taken up by the interface 54 between the crown 20 and piston body 12. Since the only load on it is a compressive one, the thermal stress caused by the temperature gradient is not as detrimental as it would be if it occurred in the crown 20. With the plurality of discs, the gradient is distributed over a plurality of interfaces thereby minimizing the stresses on the individual elements.

Any variations in thermal expansion which occur between the piston body, interface 54 and crown 20 are compensated for by the spring assembly 50 to assure a relatively uniform compressive loading holding the parts together. Since the shoulder 42 is larger in area than that available on the body 12 for receiving the spring assembly 50, spacer element 46 assures a greatly improved seat for carrying the joint load on the body 12.

The above piston achieves the objectives of a well insulated combustion chamber to increase efficiency and to reduce emissions. Furthermore it does so with an economical, effective construction that permits ready replacement of the parts.

Having described the invention what is novel and desired to be claimed and secured by letters patent of the United States is:

1. A piston for an internal combustion engine, said piston comprising:
    a crown portion of temperature resistant material, said crown portion having a circular periphery;
    a one piece aluminum piston body having a circular periphery, said crown portion and said piston body having opposed planar surfaces, the opposed planar surface of said crown portion being the sole surface facing said piston body, and the opposed planar surface of said piston body being defined by a recess in said piston body facing said crown portion;
    a plurality of stacked steel discs having a relatively low conductivity planar interface between adjacent discs and positioned between the opposed planar surfaces of said crown portion and piston body for forming a low effective thermal conductivity interface, the planar surface of said crown portion extending radially outward at least as far as the periphery of said discs,
    means for fastening said crown portion to said piston body, thereby sandwiching said discs between the crown portion and the piston body, said discs being freely separable from one another in the absence of the fastening means,
    whereby the temperature gradient across said crown portion is minimized,
    wherein said crown, said discs, and said piston body have aligned holes, the one in said piston body terminating in an interior recess thereof, and wherein said fastening means comprises a bolt extending through said holes and having a head positioned on said crown portion and a threaded portion extending through said piston body to said interior recess, a nut threaded onto said bolt, and a plurality of belleville washers positioned between said nut and said piston body for yieldably urging said piston body and crown portion towards one another, said piston body has a larger diameter hole than the one through said crown portion, said piston further comprises a steel sleeve-like insert supported in said hole of said piston body, said insert having a flange which abuts the interior recess of said piston body, said washers acting between said insert and said nut; and
    wherein said discs do not extend to the periphery of the interface between the crown portion and the piston body, the overall thickness of said stacked discs being selected so that the crown portion and said piston body are maintained out of contact with one another.

* * * * *